L. F. ADT.
EYEGLASSES.
APPLICATION FILED MAY 3, 1907.
1,007,321.
Patented Oct. 31, 1911.
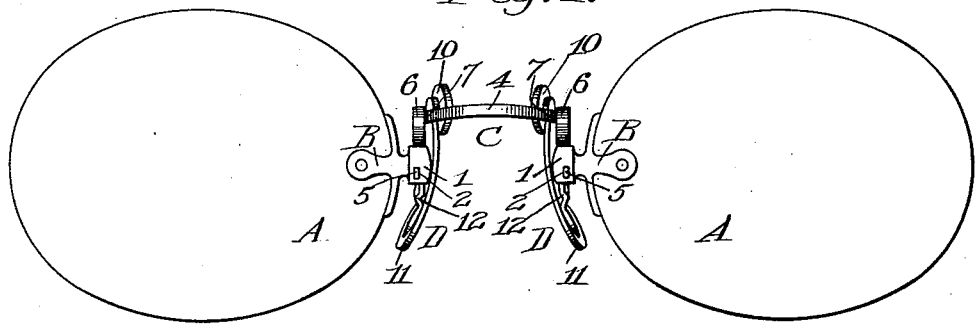
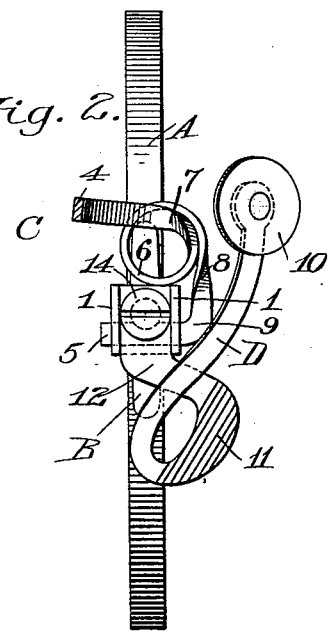
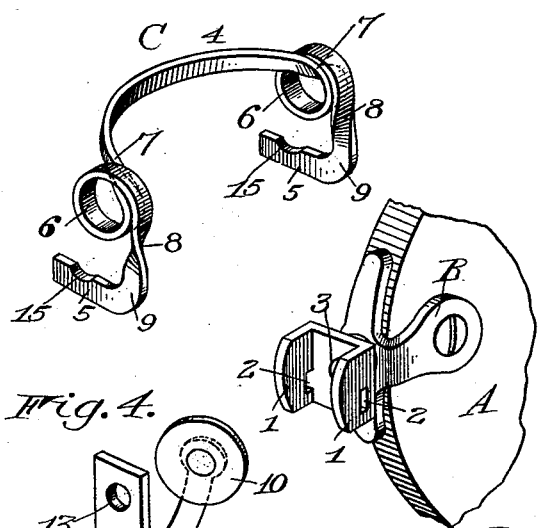
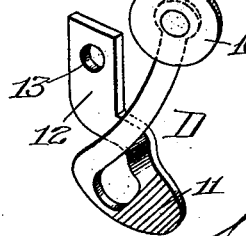

UNITED STATES PATENT OFFICE.

LEO F. ADT, OF ALBANY, NEW YORK.

EYEGLASSES.

1,007,321.   Specification of Letters Patent.   Patented Oct. 31, 1911.

Application filed May 3, 1907. Serial No. 371,749.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of the specification, and to the reference-numerals marked thereon.

This invention relates to eyeglasses and particularly to that type in which the bridge is provided with spring portions permitting the movement of the lenses in the plane of their optical axes for the purpose of positioning the nose guards; one object of the present invention being to arrange these spring portions so that the appearance of the eyeglasses will be improved when viewed from the front; and another object being to construct said spring portions in such a manner that the pupillary distance between the lenses may be varied without destroying the spring action.

To these and other ends the invention consists in certain improvements and combinations of parts all as will be hereinafter more fully described, the novel features being pointed out in the claims at the end of the specification.

In the drawings: Figure 1, is a front view of a pair of eyeglasses embodying my invention. Fig. 2, is a central vertical section. Fig. 3, is a perspective view of the bridge. Fig. 4, is a perspective view of one of the guards, and Fig. 5, is a perspective view of one lens attaching member.

With more particular reference to the drawings A indicates the lenses, B the lens-attaching members, C the bridge and D the nose guards. Each lens-attaching member B is secured to its lens in any suitable manner and is preferably provided with a post having a box at its inner end formed with a vertical seat, the vertical side flanges 1 of which are formed with horizontally alined rectangular openings 2 slightly to one side of the central horizontal plane of the screw opening 3. The bridge C comprises a bridging portion 4, attaching arms 5, and spring portions 6 preferably in the form of vertical coil or volute springs positioned above lens-attaching members B and having horizontal axes arranged substantially in the plane of the lenses. In the embodiment shown, the bridge is formed from a strip of flat stock which has a widthwise bend near its middle to provide the bridging portion 4. At each end of the bridging portion quarter twists 7 are provided and then follow, successively, widthwise bends downward, forward, upward, rearward and downward to form a coil or volute spring 6 having all portions in the same vertical plane. The stock is further formed with a quarter twist 8 at the end of each coil and is continued downwardly and then forwardly edgewise of the stock at 9 to provide the angular attaching arms 5, the ends of which lie substantially beneath the coils. The nose guards D may be of any suitable construction, but each is preferably provided with an upper bearing pad 10, a lower bearing pad 11 and an upwardly extending or vertical attaching arm 12, which is provided with a suitable screw opening 13.

To connect the parts of the mounting, the forwardly extending portions of the attaching arms 5 are introduced into the alined openings 2 of the lens attaching members from the rear of the lenses, and the upwardly extending arms 12 of the noseguards are fitted between the side flanges 1. Screws 14 are then passed through the openings 13 and engaged with the threaded walls of openings 3, thus clamping the attaching arms 5 to the lens attaching members, the arms being provided with notches 15 which receive portions of the screws 14 and prevent the withdrawal of the said arms from the openings 2.

The optical relation of the lenses is insured in the mountings herein shown because the bridging portion of the bridge is substantially rigid and the spring action takes place in the coils, which, being connected at their inner ends to the bridging portion, also permit the adjustment of the pupillary distance between the lenses without having their spring action destroyed. The arms extending downwardly from the rear sides of the coils increase the resiliency of the bridge and also increase the range of adjustment for pupillary distance. These arms are located in planes with the lens attaching devices or boxes transverse of the plane of the lenses and preferably in rear of said boxes so that the increased length of the bridge is not apparent from the front of the lenses. Further, these springs being volute in form and being arranged directly over the lens-attaching members with their side faces transverse to the plane of the lenses, give an improved appearance to the eyeglasses either when viewed from in front or when viewed from the sides.

I claim as my invention:

1. In eyeglasses, the combination with a pair of lenses, of lens attaching members secured to the lenses and having boxes at their inner ends, and a spring bridge having coils therein arranged directly over and entirely above the boxes, and arms each having a portion extending downwardly from the coils free of and on one side of a box and a portion connected to the first named portion by a bend and secured in the box.

2. In an eyeglass mounting, the combination with lens attaching members having boxes at their inner ends, of a spring bridge provided with coils arranged over and entirely above the boxes having their side faces vertical and transverse to the plane of the lenses, and arms each extending downwardly from the rear of the coils and in rear of the boxes and secured within the latter.

3. A spring bridge for eyeglasses comprising a bridging portion, coils having their side faces vertical, arranged at the ends of the bridging portion on a common axis, and angular arms extending downwardly from the rears of the coils and having their ends positioned beneath the coils so that the latter lie entirely above said ends.

4. A spring bridge for eyeglasses comprising a bridging portion, coils having their side faces vertical, arranged at the ends of the bridging portion, and angular arms extending downwardly from the coils and having their ends projecting beneath the coils so that the latter lie entirely above said ends.

5. In eyeglasses, a pair of lenses, lens-attaching members secured to the lenses and having boxes at their inner ends, and a bridge provided with spring portions arranged above the boxes and in the plane of the lenses, and with resilient arms extending downwardly from the spring portions in the rear of the boxes and secured in the latter.

6. In eyeglasses, a pair of lenses, lens-attaching members having boxes at their inner ends, and a bridge comprising a pair of volute spring portions, having their side faces arranged vertically and transversely to the plane of the lenses, a bridging portion connected to the inner ends of the spring portions and attaching arms extending from the outer ends of the spring portions and secured in the boxes.

7. A bridge for eyeglasses formed from flat stock and comprising a nose bridging portion, twisted portions at the ends of the nose bridging portion, vertical volute coils connected at their inner ends to the twists and formed by widthwise bends in the stock, twists at the outer ends of the coils, and attaching arms connected to the twists.

8. In an eyeglass mounting, the combination with a pair of lens attaching members having boxes, of a spring bridge comprising a nose bridging portion, a coil at each end of the nose bridging portion lying in the same planes with the boxes and transverse to the plane of the lenses, resilient arms proceeding from the coils exteriorly thereof and relatively angularly extending arms at the ends of said resilient arms secured in the boxes.

9. In an eyeglass mounting, the combination with lens attaching members having boxes, of a bridge comprising a central nose bridging portion, a volute coil at each end of the central nose bridging portion having its flat faces vertical and lying in the same plane with a box and transverse to the plane of the lenses, resilient arms proceeding from each of said coils exteriorly thereof and lying in the same planes with the latter and the boxes, and arms connected to the resilient and relatively angularly extending arms and secured in the boxes.

10. In an eyeglass mounting, the combination with lens attaching members having boxes, of a spring bridge embodying a central nose bridging portion, coils arranged at the ends of the bridging portion on a common axis over the boxes, resilient arms proceeding downwardly from the rear sides and exteriorly of the coils in rear of the boxes, and arms connected to the resilient arms and secured in the boxes.

LEO F. ADT.

Witnesses:
H. H. SIMMS,
FLORENCE E. FRANCK.